United States Patent
Håkansson et al.

(10) Patent No.: US 7,860,509 B2
(45) Date of Patent: Dec. 28, 2010

(54) METHODS AND ARRANGEMENTS FOR ADAPTIVE THRESHOLDS IN CODEC SELECTION

(75) Inventors: Stefan Håkansson, Luleå (SE); Stefan Bruhn, Sollentuna (SE); Tomas Lundberg, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1611 days.

(21) Appl. No.: 11/139,996

(22) Filed: May 31, 2005

(65) Prior Publication Data

US 2006/0069553 A1 Mar. 30, 2006

(30) Foreign Application Priority Data

Sep. 30, 2004 (SE) .................................... 0402372

(51) Int. Cl.
*H04W 72/00* (2009.01)
(52) U.S. Cl. ................. 455/452.2; 455/439; 455/67.11; 704/201; 704/221; 704/229; 704/500; 370/252; 370/231; 370/401; 370/235; 370/331
(58) Field of Classification Search ................. 704/201, 704/219, 221, 229, 500; 455/423, 439, 425, 455/436, 452.1, 438, 452.2, 67.11; 370/252, 370/231, 401, 235, 331, 356, 389
See application file for complete search history.

(56) References Cited

U.S. PATENT DOCUMENTS

| | | | |
|---|---|---|---|
| 6,034,971 A | 3/2000 | Love et al. | |
| 6,782,367 B2* | 8/2004 | Vainio et al. | 704/500 |
| 6,940,967 B2* | 9/2005 | Makinen et al. | 379/387.01 |
| 6,978,130 B2* | 12/2005 | Nagata | 455/422.1 |
| 7,171,246 B2* | 1/2007 | Mattila et al. | 455/570 |
| 7,315,814 B2* | 1/2008 | Vainio et al. | 704/221 |
| 7,394,807 B2* | 7/2008 | Hamiti et al. | 370/389 |
| 7,403,892 B2* | 7/2008 | Sjoberg et al. | 704/201 |
| 2003/0063569 A1* | 4/2003 | Kalliokulju et al. | 370/252 |
| 2003/0097258 A1 | 5/2003 | Thyssen | |

(Continued)

FOREIGN PATENT DOCUMENTS

EP    1 162 601 A2    12/2001

(Continued)

OTHER PUBLICATIONS

Tech. Spec. 3GPP TS 26.071, V4.0.0 "Mandatory Speech Codec Speech Processing Functions; AMR Speech Codec; General Description (Release 4)" (Mar. 2001).

(Continued)

*Primary Examiner*—Vijay B Chawan
(74) *Attorney, Agent, or Firm*—Nixon & Vanderhye P.C.

(57) ABSTRACT

A method and arrangement for dynamically adapting thresholds used for selecting a codec mode to be used is presented. Thresholds are adapted in response to the current received signal quality. An estimate of actual prevailing received signal quality is obtained on which the adaptation is based. The present invention can be applied either on the mobile terminal side or on the network side, working on the uplink and/or the downlink. The thresholds can be modified on the receiving side, or, when operating in the network and working on the downlink, the threshold adaptation can be initiated in the terminal.

37 Claims, 10 Drawing Sheets

U.S. PATENT DOCUMENTS

| | | | |
|---|---|---|---|
| 2004/0047437 A1* | 3/2004 | Hamiti et al. | 375/326 |
| 2004/0098251 A1* | 5/2004 | Vainio et al. | 704/201 |
| 2004/0128125 A1* | 7/2004 | Makinen et al. | 704/219 |
| 2004/0203448 A1* | 10/2004 | Nagata | 455/67.11 |
| 2004/0267519 A1* | 12/2004 | Sjoberg et al. | 704/201 |
| 2005/0030823 A1* | 2/2005 | Tsuyuno et al. | 365/232 |
| 2005/0055203 A1* | 3/2005 | Makinen et al. | 704/229 |
| 2005/0143984 A1* | 6/2005 | Makinen et al. | 704/219 |
| 2005/0267743 A1* | 12/2005 | Gerlach | 704/221 |
| 2006/0224381 A1* | 10/2006 | Makinen | 704/223 |
| 2006/0281485 A1* | 12/2006 | Johnson et al. | 455/552.1 |

FOREIGN PATENT DOCUMENTS

| | | |
|---|---|---|
| GB | 2 391 431 A | 2/2004 |
| WO | 03/019850 A1 | 3/2003 |

OTHER PUBLICATIONS

Wanstedt et al, "Development of an Objective Speech Quality Measurement Model for the AMR Codec", 2002.

Tech. Spec. 3GPP TS 26.171, V6.0.0, "Speech Codec Speech Processing Functions; Adaptive Multi-Rate-Wideband (AMR-WB) Speech Codec; General Description (Release 6)" (Dec. 2004).

Tech. Spec. 3GPP TS 45.009, V6.1.0, Technical Specification Group GSM/EDGE Radio Access Network; Link Adaptation (Release 6) (Feb. 2004).

Tech. Spec. ITU-T P.862, "Series P: Telephone Transmission Quality, Telephone Installations, Local Line Networks; Methods for Objective and Subjective Assessment of Quality" (Feb. 2001).

Tech. Spec. 3GPP TS 45.008, V6.12.0, "Technical Specification Group GSM/EDGE Radio Access Network; Radio Subsystem Link Control (Release 6)" (Apr. 2005).

International Search Report and Written Opinion mailed Nov. 28, 2005 in corresponding PCT application No. PCT/SE2005/001380.

Ojala, "Toll Quality Variable-Rate Speech CODEC", Acoustics, Speech, and Signal Processing, 1997, IEEE Int'l. Conference on Toll Quality Variable-Rate Speech CODEC, publication date Apr. 21-24, 1997, vol. 2, pp. 747-750.

Makinen et al, "Source Signal Based Rate Adaptation for GSM AMR Speech CODEC", Proceedings of the Int'l. Conference on Information Technology; Coding and Computing (ITCC '04), Apr. 5-7, 2004, Las Vegas, NV and Piscataway, NJ USA, IEEE.

Jelinek, "On the Architecture of the CDMA 2000® Variable-Rate Multimode Wideband (VMR-WB) Speech Coding Standard", Acoustics, Speech, and Signal Processing, 2004, Proceedings IEEE Int'l. Conference on Montreal, Canada May 17-21, 2004, Piscataway, NJ USA, IEEEE.

Homayounfar, "Rate Adaptive Speech Coding for Universal Multimedia Access", Signal Processing Magazine, IEEE Rate Adaptive Speech Coding for Universal Multimedia Access, Mar. 2003, vol. 20, pp. 30-39.

Chinese Office Action dated Apr. 14, 2010 (17 pages).

* cited by examiner

METHODS AND ARRANGEMENTS FOR ADAPTIVE THRESHOLDS IN CODEC SELECTION

TECHNICAL FIELD

The present invention relates in general to communication systems using multi-codecs and methods therefore, and in particular to such methods and devices using selection thresholds.

BACKGROUND

Speech codecs using Adaptive Multi Rate (AMR) [1,2] enable provision of excellent speech quality and provide at the same time a way forward towards state-of-the-art, spectrally efficient, high capacity cellular networks. One straightforward way to characterize the benefit of AMR speech codecs is that the robustness to interference and noise in radio networks is increased and that this advantage over other, non-adaptive, speech codecs can be capitalized on in several different ways, e.g. by enhancing speech quality or improving spectral efficiency. AMR codecs are standardized by 3GPP for the Global System for Mobile communication (GSM), currently the world's most widespread cellular technology, as well as for Wideband Code Division Multiple Access (WCDMA).

Narrowband AMR consists of eight codec modes with different source bit rates, from 12.2 kbps down to 4.75 kbps. For AMR in GSM, a number of codec modes are collected into a pre-defined Active Codec Set (ACS), which is fixed during a call. The level of channel coding is adjusted while the total bit rate is constant. Consequently, the lower the source bit rate becomes, the more robust the codec is against bit errors. For codec mode adaptation, the receiving side performs link quality measurements of the incoming channel yielding a Quality Indicator (QI), which is defined as an equivalent Carrier-to-Interferer ratio (C/I) [3]. The QI is then compared against a set of fixed, pre-defined thresholds to decide which codec mode to use.

SUMMARY

To obtain the best possible speech quality in AMR codecs, it is important to properly select the thresholds for codec mode adaptation. However, to obtain a QI that correctly reflects the speech quality for all radio conditions, frequency hopping schemes and network configurations may be quite complicated. Furthermore, conditions vary over time. There may also be performance variations between different receiver units, both regarding actual performance and QI estimation. This means that it is likely that even well-selected adaptation thresholds will not be optimal at all times. Fixed thresholds can be sub-optimal for the current conditions by being either too high or too low. In the case where the thresholds are too high, a switch from a less robust codec mode to a more robust mode will be initiated earlier than necessitated by the radio conditions. This will cause a slight degradation of the speech quality due to the lower intrinsic speech quality of the more robust codec mode. A more serious problem arises when the thresholds are too low, causing the switch from the less robust mode to occur too late. This may significantly increase the errors on the radio link and in turn cause a severe degradation of the speech quality. Hence, since both cases lead to speech quality reductions, they should both be avoided.

A general object of the present invention is to provide improved methods and devices for selection of codec modes in multi-codec systems. A further object of the present invention is to provide methods and devices providing selection of codec modes that are less sensitive to differences in radio conditions or estimation thereof.

In general words, a proposed solution is to use thresholds that are adaptive in response to the current received signal quality. A preferred algorithm for threshold adaptation is quite general and can be applied either on the terminal side or on the network side, working on the uplink and/or the downlink. The thresholds can be modified on the receiving side, or, when operating in the network and working on the downlink, the threshold adaptation can be applied in the terminal. An aspect of the present invention is intended to operate with AMR and AMR-like speech and audio codecs, e g AMR-WB and AMR-WB+, regardless of the particular radio access method, but may also operate with other codec selecting techniques that are based on link quality thresholds.

One advantage with the present invention is that thresholds for selecting appropriate codec modes are kept adjusted to prevailing radio conditions and estimation properties, which increases the total average speech quality.

BRIEF DESCRIPTION OF THE DRAWINGS

The invention, together with further objects and advantages thereof, may best be understood by making reference to the following description taken together with the accompanying drawings, in which:

FIG. 9B is a schematic block scheme of main parts of another embodiment of a codec system for uplink transmission according to the present invention.

DETAILED DESCRIPTION

Figure 1:
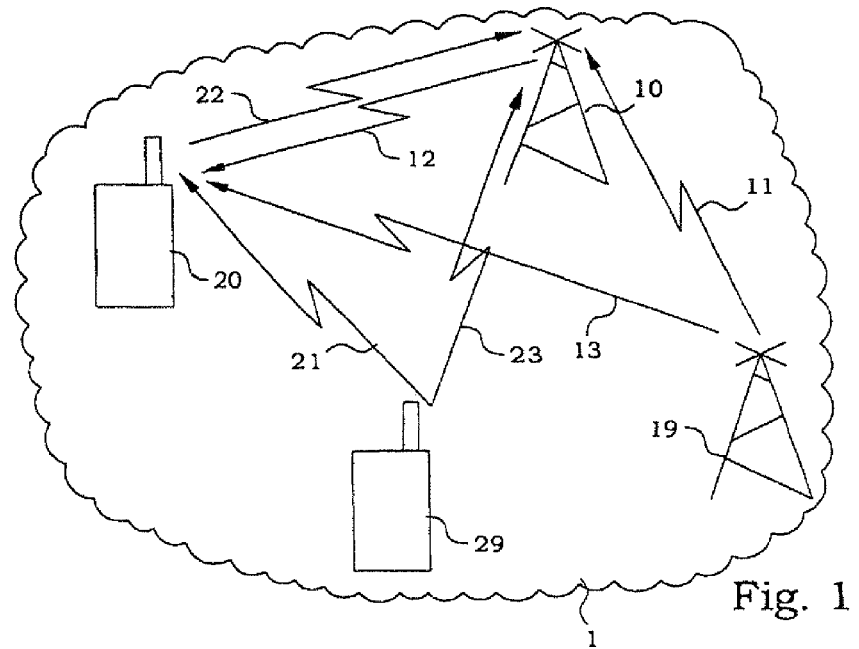
FIG. 1 is a schematic block scheme of a wireless communications system.

FIG. 1 illustrates schematically a wireless communications system 1. A mobile terminal 20 communicates with a base station 10. Signals transmitted from the base station 10 to the mobile terminal 20 are denoted downlink signals 12 and signals transmitted from the mobile terminal 20 to the base station 10 are denoted uplink signals 22. The radio conditions are determined e.g. by the distance between the transmitter and receiver, and the topology of the nature in the surroundings of the path of the signals. The radio conditions are also influenced by interfering radio signals. Another base station 19 may e.g. emit signals 11, 13, which may interfere with the uplink 22 and downlink 12 signals. Similarly, another mobile terminal 29 may also provide interfering signals 21, 23.

In an AMR approach, varying link conditions call for different codecs to be used, in order to ensure a certain speech quality. The link conditions are quantized as a link quality LQ, typically related to a measure of the C/I. Many different methods for estimating C/I are available in prior art, performed at the transmitting and/or receiving end. C/I measures can thus be either directly or indirectly measured or reported from elsewhere in the system. Based on the LQ, a suitable codec mode is selected. Typically, such a selection is implemented by a set of thresholds. For LQ values below a first threshold, a first codec mode is applied, typically the most robust one available. Between the first threshold and a second higher threshold, a second codec mode is applied, and so forth. By introducing n thresholds, one may select between n+1 codec modes.

Figure 2A:
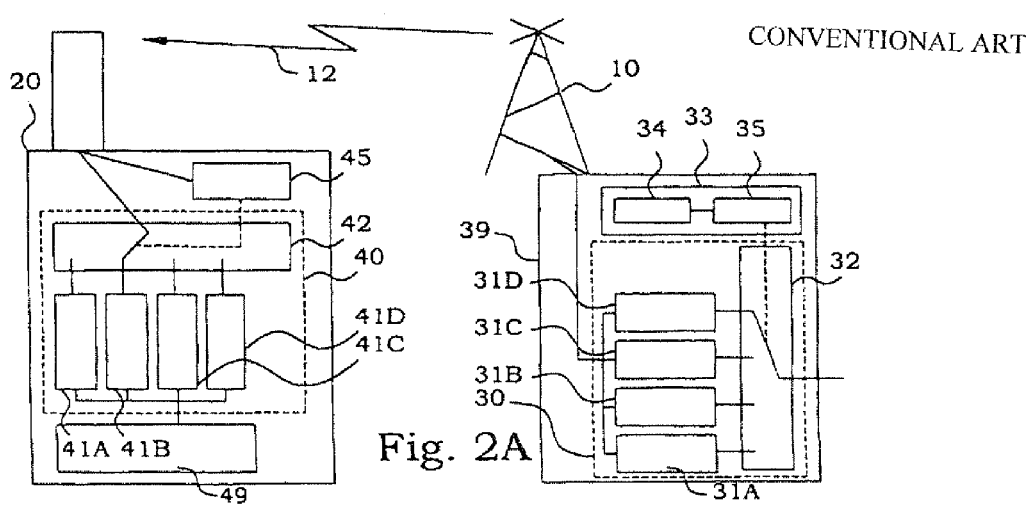
FIG. 2A is a schematic block schemes of a typical AMR codec system for downlink transmission.

FIG. 2A illustrates a typical AMR codec system for downlink transmission. A codec selection unit 39 of a base station 10 comprises an AMR codec 30. The AMR codec 30 comprises in the present embodiment four codec modes 31A-D. A mode switch 32 connects and input signal terminal to one of the codec modes 31A-D. The mode switch 32 is controlled by a threshold comparator 35 in a switch control unit 33. The switch control unit 33 also comprises a link quality provider 34, which provides an estimate of the LQ of the intended link to be used. Typically, the link quality provider 34 receives an LQ estimate from the mobile terminal 20. The threshold comparator 35 decides between which thresholds the LQ is situated and selects a codec mode accordingly. The items in the figure are typically functional items and may very well be implemented by software in one and the same processor.

The signal to be transmitted is coded using the selected codec mode and is transmitted over the downlink 12.

The base station 10 also informs the mobile station 20 about which codec mode that is used. This can be performed either in a separate message using any type of control signaling or together with the coded signal itself. The mobile station 20 receives the information about which codec mode that is used in a switch control unit 45. The mobile station 20 comprises an AMR decodec 40, which in the present embodiment in turn comprises four decodec modes 41A-D and a mode switch 42. In response to the information on which codec mode that was used in the transmitter, the mode switch 42 selects the appropriate decodec mode 41A-D. The decoded signal is then forwarded to further processing, here represented by a unit 49.

Figure 2B:
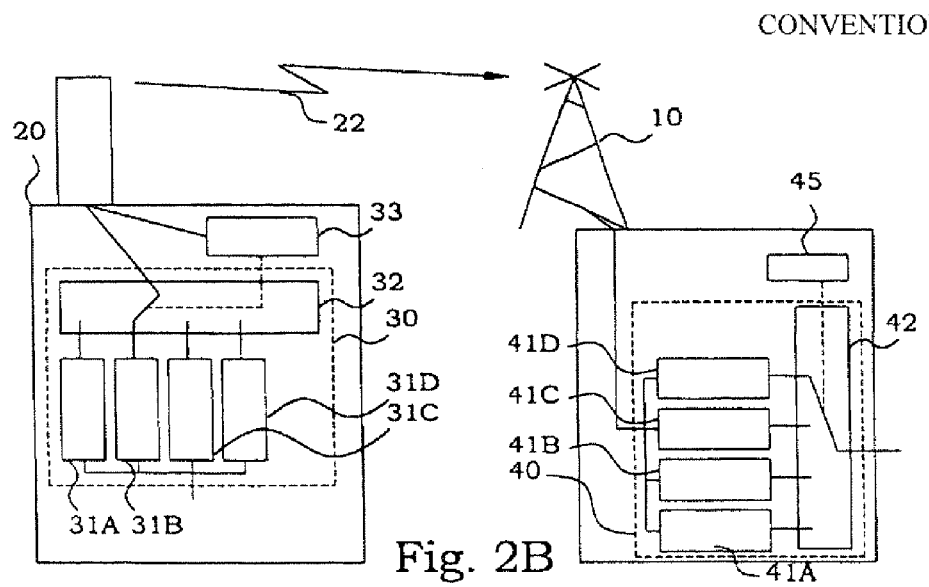
FIG. 2B is a schematic block schemes of a typical AMR codec system for uplink transmission.

FIG. 2B illustrates a typical AMR codec system for uplink transmission. A codec selection unit of a mobile terminal 20 comprises an AMR codec 30. The AMR codec 30 comprises in the present embodiment four codec modes 31A-D. A mode switch 32 connects and input signal terminal to one of the codec modes 31A-D. The mode switch 32 is controlled by a switch control unit 33. The mobile station 20 typically receives in the switch control unit 33 the information about which codec mode that should be used from the base station 10. In alternative embodiments, the switch control unit 33 may make such decisions at its own. The items in the figure are typically functional items and may very well be implemented by software in one and the same processor or in a plurality of processors.

The signal to be transmitted is coded using the selected codec mode and is transmitted over the uplink 22.

The base station 10 comprises an AMR decodec 40, which in the present embodiment in turn comprises four decodec modes 41A-D and a mode switch 42. In response to the information on which codec mode that should be used in the mobile station 20, a switch control unit 45 controls the mode switch 42 to select the appropriate decodec mode 41A-D. The decoded signal is then forwarded to further processing.

According to the present invention, devices, systems and methods according to the above presented principles are additionally provided with means for adaptation of thresholds based on prevailing received speech quality.

Figure 3:
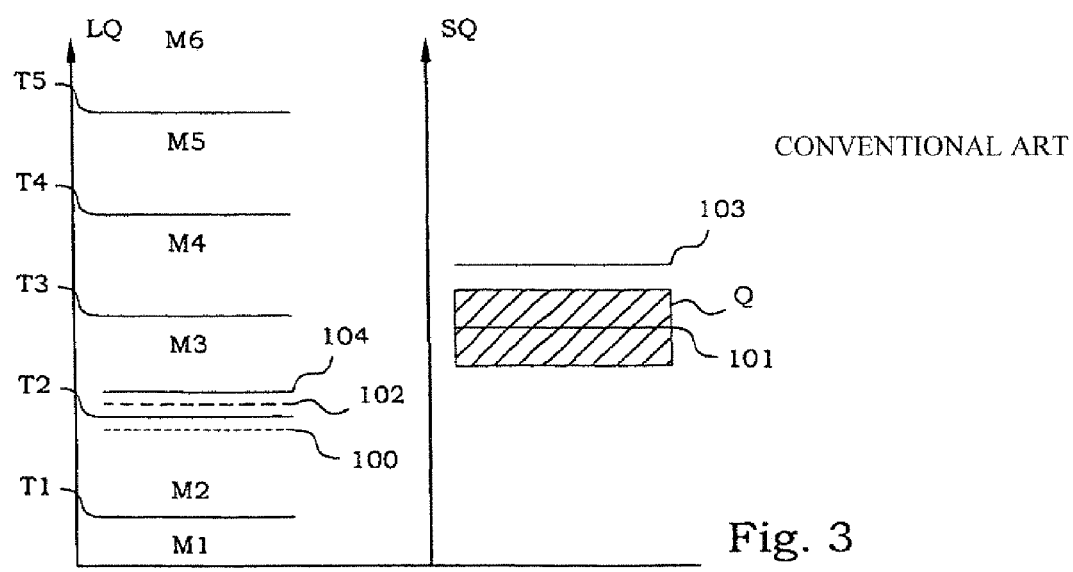
FIG. 3 is a diagram illustrating relations between link qualities and speech qualities for different codec situations.

FIG. 3 is a diagram illustrating in the left part thresholds T1-T5 for codec mode selection. In present GSM-AMR, maximum four codec modes can be used in each ACS, which means that three thresholds are used. However, the present invention is not limited to GSM-AMR and operates with any number of modes. FIG. 3 therefore represents a generalized configuration having 6 modes and 5 thresholds. For LQs between these thresholds different codec modes M1-6 are to be selected. The thresholds T1-5 are determined to, at least theoretically, provide speech within a certain target quality interval Q, as illustrated by the hatched region in the right part of the diagram. If the thresholds T1-5 are determined in an appropriate manner and if the link quality value on which the selection is based is true, an actual link quality, e.g. represented by the dashed line 100 will provide a speech quality 101 within the interval Q.

If one now assumes that the link quality is overestimated, i.e. that a provided estimate 102 of a link quality is higher than the actual one 100, the selection of codec mode might not be optimum. In FIG. 3, the measured link quality falls above the T2 threshold, which means that codec mode M3 is selected instead of the optimal choice M2. As a consequence thereof, the average speech quality of the transmitted speech will rise above the interval Q as represented by the dashed line 103.

In such a situation, the threshold T2 should preferably be adjusted as a kind of calibration to the, somewhat inaccurate, link quality estimation in the receiver. By increasing the T2 threshold to be situated at the level represented by the dotted line 104, an accurate choice of codec mode M2 will be performed, which will render a speech quality within the interval Q.

One may here notice, that if the inaccuracy in link quality estimation is systematic, the same error will be present at all thresholds, and preferably, all thresholds could be adjusted by the same amount.

Also if the assumed relation between a certain combination between link quality and codec mode, and the speech quality rendered is somewhat inaccurate, e.g. if a theoretical oversimplification is made, an adjustment of a threshold may tune in the result to the desired speech quality interval. In cases where such relation errors are systematic, a simultaneous adjustment of all thresholds could be preferred. In other cases, individual adjustments for individual thresholds are instead more appropriate.

Figure 4:
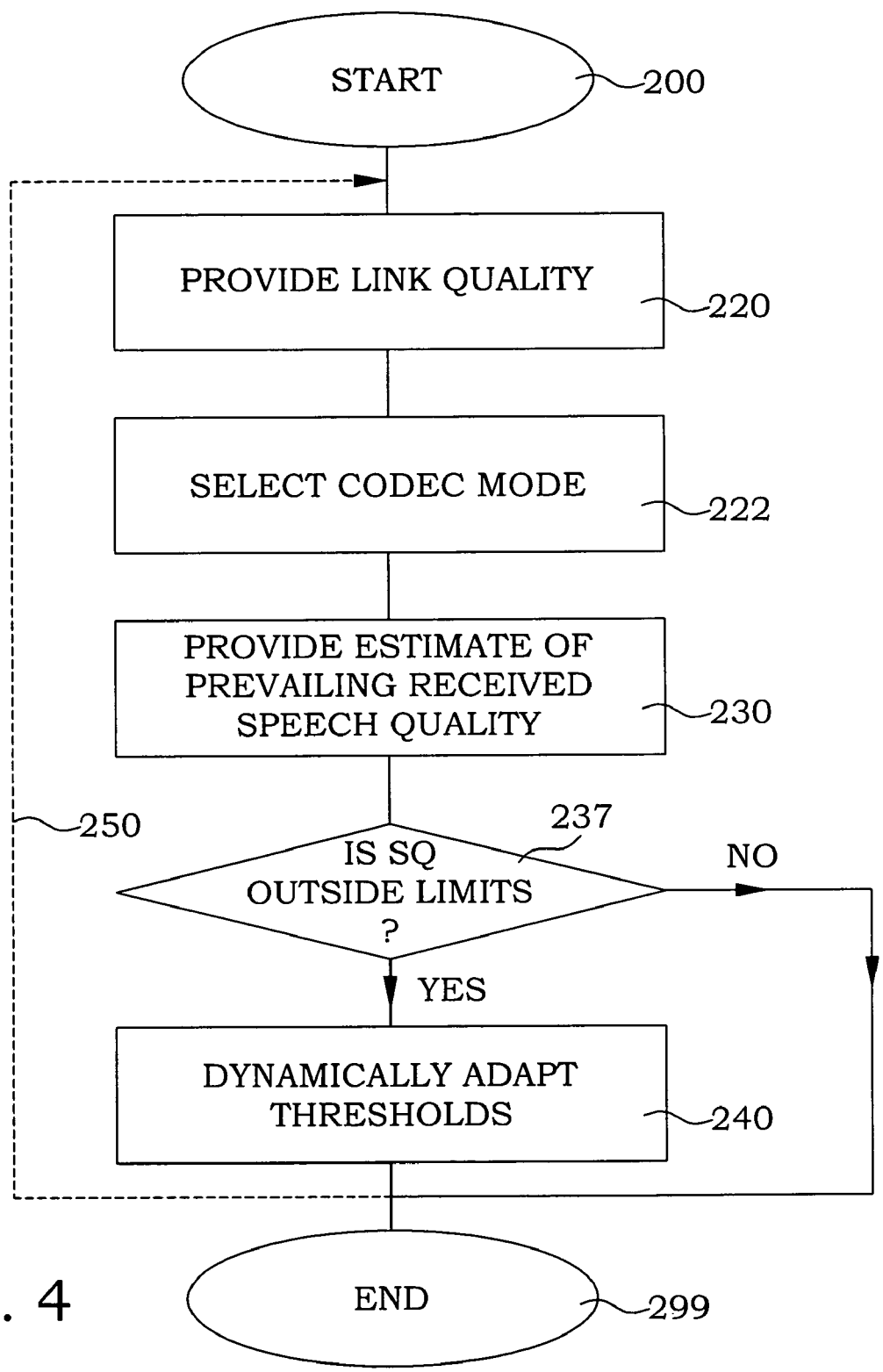
FIG. 4 is a flow diagram of main steps of an embodiment of a method according to the present invention.

An embodiment of a method according to the present invention is illustrated in FIG. 4 at a general level. The procedure starts in step 200. In step 220, link quality measurements are provided. In step 222 a codec mode to be used is selected among a set of available codec modes by comparing the measured link quality to a set of thresholds. A prevailing received signal quality estimate is provided in step 230. In step 237, it is decided if the signal quality estimate is outside a pre-determined signal quality interval for the used codec mode. If the signal quality estimate is within the interval, no threshold adaptation is made, or alternatively a threshold adaptation of "zero" magnitude is performed, and the procedure continues to step 299. If the signal quality estimate is outside the interval, the procedure proceeds to step 240, in which the set of thresholds is dynamically adapted in response to the estimate of prevailing received signal quality. The procedure ends in step 299. Even if the procedure is illustrating as a single row of steps, the actual procedure typically is repeated a number of times, illustrated by the dashed arrow 250.

Also note, that the threshold adjustment steps can be separated from the actual selection steps, and the performance of the different steps can be repeated independently of each other.

Figure 5:
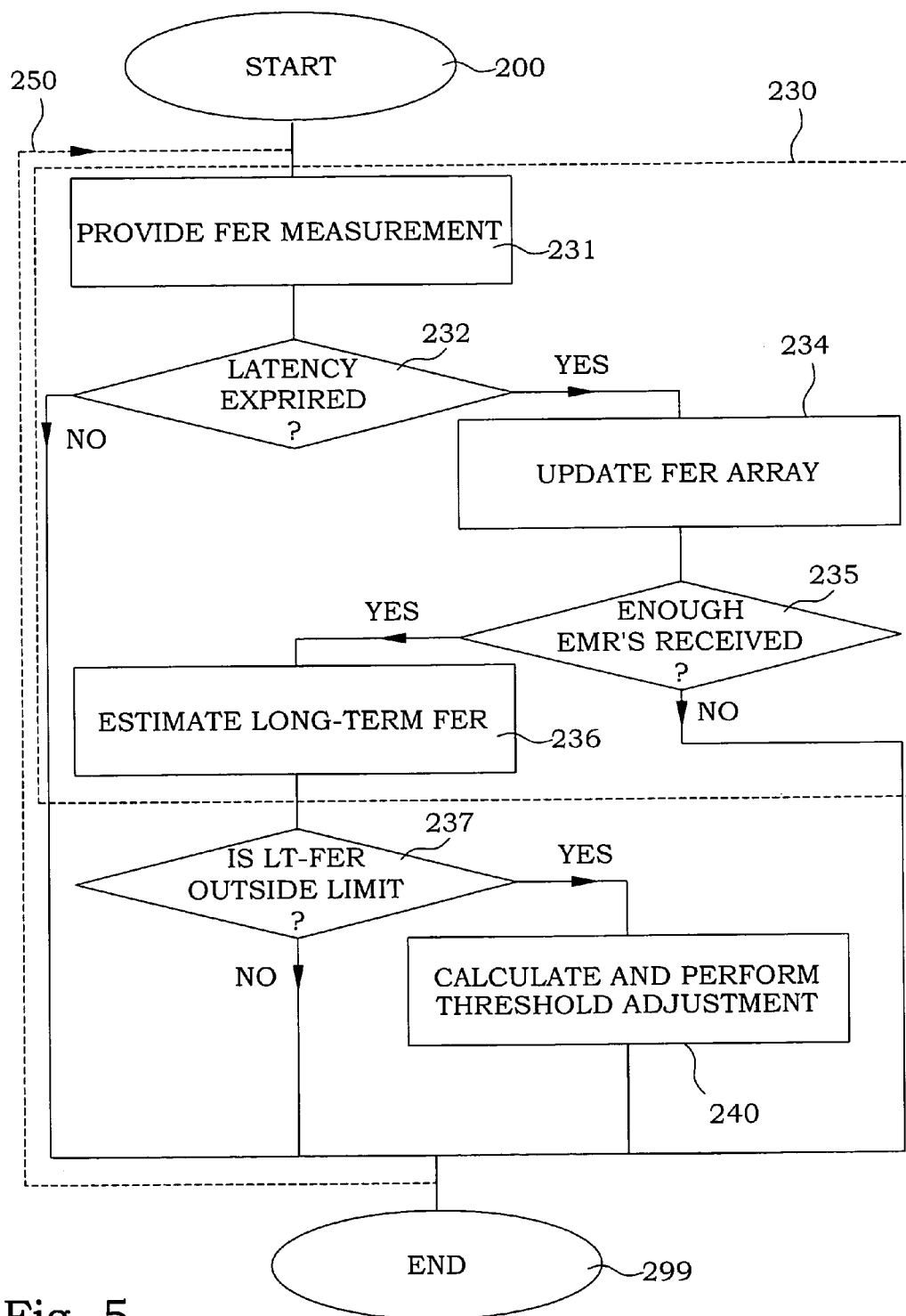
FIG. 5 is a flow diagram of main steps of another embodiment of a method according to the present invention.

A particular embodiment of an algorithm for the threshold adjustment steps is presented in connection with FIG. 5. The adaptive thresholds algorithm estimates the speech quality on the receiving link and compares the estimate against given speech quality limits for each codec mode. The speech quality could be estimated from frame erasure measures, e g FER, bit error rate measures, e g RxQual, or objective speech quality measures, e g SQI [4] or PESQ [5]. If the estimated speech quality for a given mode is outside its limits, either too good or too bad, it is likely that the associated threshold for switching to the appropriate adjacent codec mode is sub-optimal for the current radio conditions. The algorithm will then modify all the codec mode switching thresholds. One reason for modifying all thresholds instead of only the associated threshold is that it makes it much easier to always maintain the thresholds in a consistent order, i.e. that they do not overlap [3]. Such problems are discussed more in detail further below.

In a typical case, a single value of the speech quality estimated for the receiving link is too noisy for direct use in a threshold adjustment decision. Instead, in the present embodiment, a long-term average is calculated. The calculation of the threshold adjustment is based on the long-term speech quality and on the attainable speech quality with the current ACS. Due to the averaging process used in obtaining the long-term speech quality, several threshold adjustments will usually have to be made.

For an application of a network-based algorithm working on the downlink signal, the new set of thresholds will be sent to a mobile station by stealing one speech frame, effectively causing an erased frame. Consequently, the algorithm should preferably not be allowed to update the thresholds too often Simulations show, however, that this is typically not a problem in realistic scenarios.

By way of illustration, an algorithm for adaptive thresholds for AMR in GSM has been developed and evaluated. The proposed threshold adaptation is applied in a configuration working on a network side and on the downlink, since it is considered particularly useful. This allows for aligning the AMR performance of mobile stations from different vendors without the need of changing the mobile station, which would require standardization. The input to the algorithm in this particular embodiment is FER reported by the mobile station, i.e. FER is the "speech quality measure" referred to above. The FER is obtained from the Enhanced Measurement Report (EMR) [6]. Consequently, a necessary requirement for the algorithm of the present embodiment to work is that the mobile station supports EMR. EMR includes the number of correctly received frames during the measurement period of 480 ms, i.e. 24 speech frames. The FER is not directly reported in the EMR. What is reported is instead the number of correctly received blocks. However, the FER can be calculated from this since the base station system (BSS) knows the number of sent blocks. The algorithm is intended to be run as soon as an EMR has been received.

The procedure starts in step 200. In step 231, inputs necessary for the algorithm are provided. The algorithm of the present embodiment needs two inputs: the FER of the mobile station and the latest codec mode used by the mobile station during the last EMR measurement period. Both inputs can be obtained, directly or indirectly, through the EMR sent from the mobile station.

If a threshold change has been made, it will take some time before the change has been applied by the MS. This means that one or a few FER measurements, measured immediately after the decision to change the thresholds has been made, will be representative to the old threshold and should therefore not be used for further evaluation. The present algorithm embodiment therefore has a counter, which counts how many EMR reports that have been received since the last threshold change. A certain predetermined latency period is defined and those EMRs for which the latency period hasn't expired are discarded. This is illustrated in FIG. 5 as step 232. In that case, the present algorithm returns immediately without modifying any thresholds.

The number of EMRs to discard in the present embodiment is specified with a parameter, and its default value is 1, i.e. only the first EMR immediately after a threshold change is discarded. The reason for this is that a threshold change normally takes less than 480 ms to perform.

The FER from the EMR is in step 234 stored in an array for the subsequent calculation of the long-term average FER. The behavior of the example algorithm can to a rather large extent be modified by changing how many EMRs that should be received before we continue with the calculation of the threshold adjustment. The length of the FER array is in the present embodiment controlled by a parameter. One possibility is to specify that the whole FER array should have been filled before changing a threshold. Another possibility is to always allow threshold changes irrespective of how many EMRs that have been received. The first case will henceforth be called "AT1" and the second case "AT2". In the extreme cases, one can say that AT1 gives large threshold changes but seldom, while AT2 gives smaller changes but more often. As will be discussed further below, AT2 will also give threshold changes that in principle have fixed values.

Since the threshold changes will be sent to the MS by stealing speech frames it is clear that making threshold changes too often will deteriorate the speech. On the other hand, the default length of the FER array is so large (its default length is 60 in the present embodiment) that waiting until it has been totally filled before changing thresholds means that the thresholds will remain unmodified for quite some time. In the default case this takes almost 30 seconds. If the FER estimation in the MS is seriously wrong, this is too long to wait before changing thresholds. Results from simulations show that the thresholds should be allowed to be changed as often as possible. The benefits from changing the thresholds as soon as possible are nevertheless so large that the present algorithm embodiment should be able to do so, but with a small "grace period", which disallows threshold changes from occurring too often.

In the present embodiment, the number of EMRs that must be received before a threshold change can be made is controlled by a parameter whose default value is 10. In step 235, it is checked whether the number of received EMRs is smaller than this parameter. If not enough EMRs have been received, the procedure returns without modifying the thresholds.

The parameter controlling the number of EMRs that are necessary for performing a long-term averaging may also be dependent on different other parameters. Non-exclusive examples of such parameters are present codec mode, properties of receiver equipment, time of the day and day of the week.

The long-term FER, $FER_{lt}$, is in the present embodiment calculated in step 236 by averaging over the whole FER array. Notice that the whole FER array is used in this calculation, even though all array elements may not have been filled. This means that the long-term FER will be drastically underestimated when only a few elements in the array have been filled. This is done quite deliberately to avoid having threshold changes occurring too often, and works in parallel with the check described above.

The long-term FER, $FER_{lt}$, is then compared with an upper and a lower FER limit in step 237, and if $FER_{lt}$ is below the lower FER limit or above the upper FER limit, the procedure returns without modifying the codec mode switching thresholds. The default value for the upper FER limit is in the present embodiment 0.01, i.e. 1%, for Full Rate (FR) and 0.03, i.e. 3%, for Half Rate (HR).

From $FER_{lt}$, a threshold adjustment $\Delta\Theta$ for all thresholds is finally calculated in step 240. In the present embodiment, it is calculated as:

$$\Delta\Theta = C_{10}^{10}\log\frac{FER_{lt}}{FER_t}$$
$$= C_e \ln\frac{FER_{lt}}{FER_t}$$
$$= C_2^2 \log\frac{FER_{lt}}{FER_t}$$

There $FER_t$ is the target toward which the present algorithm embodiment aims at. Its default value is 0.0015, i.e. 0.15%, for FR and 0.003, i.e. 0.3%, for HR. The constant C controls the "aggressiveness" of the present algorithm embodiment, i.e. how fast it tries to reach the FER target. The value of C will depend on the base of the logarithm in the equation above. Table 1 gives values for logarithms in base 10, e, and 2.

TABLE 1

Values for the constant C for usage with logarithms with different bases.

|  | FR | HR |
|---|---|---|
| $C_{10}$ | 3.208 | 4.960 |
| $C_e$ | 1.393 | 2.154 |
| $C_2$ | 0.9656 | 1.493 |

A corresponding equation for a more general signal quality measure can be formulated as:

$$\Delta\Theta = f(SQ_e, SQ_t),$$

where $\Delta\Theta$ is the threshold adjustment, $f(\ )$ is a predetermined function having two variables, $SQ_e$ is the estimated prevailing received signal quality and $SQ_t$ is a target received signal quality.

The threshold adjustment $\Delta\Theta$ is in the present particular embodiment then rounded to the nearest higher half-decibel value, and added to all of the current codec mode switching thresholds.

Note that for AT2, in which we did not wait for the FER array to be filled before calculating threshold adjustments, but instead tried to do a threshold adjustment as soon as an EMR had been received, the threshold adjustment will be nearly constant. The reason for this is that a threshold adjustment is calculated as soon as the long term FER exceeds the FER limit, which means that $FER_{lt}$ will be very close to the FER limit at the moment of the threshold adjustment, except for pathological cases. For FR and using the default value for the FER limit as the value for $FER_{lt}$ in the equation further above, we get a threshold adjustment $\Delta\Theta=2.6$ dB, or rounded to the nearest higher half decibel value, $\Delta\Theta=3.0$ dB. For HR we get a rounded threshold adjustment $\Delta\Theta=4.0$ dB.

The upper FER limit was derived from the FER levels at the codec mode switching thresholds for all ACSs. The highest FER level for the higher codec mode at the downward switching thresholds was taken as a reference value. Neglecting any time spent in the lowest codec mode, this value is in principle the highest FER level that ever will be obtained during optimum settings. If a higher FER level is obtained, the link adaptation will select a lower codec mode. This FER reference value was then multiplied with 1.5 and rounded to obtain the upper FER limit.

The lower FER limit is obtained in an analogous manner. Here, the highest FER level for the lower codec mode at the upward switching thresholds is taken as the reference value. Neglecting any time spent in the highest codec mode, this is an upper limit for the lowest FER level that is ever obtained during optimum settings. If a lower FER level is obtained, the link adaptation will select a higher codec mode. This FER reference value was then divided by 1.5 and rounded to obtain the lower FER limit.

The target FER is obtained in a similar fashion as the lower FER limit. The target FER is then approximately taken as 2 times the reference value for FR, and 4 times the reference value for HR.

The constant C is obtained by making a linear approximation of the FER-to-C/I relationship in the log domain. The value for C is then taken as the absolute value of the inverted value of the slope of the linear approximation. The slope depends slightly on the codec mode, so the average over all codec modes is taken (separately for FR and HR). There is a larger dependency on the number of frequencies used for frequency hopping. The more frequencies, the larger the slope. Hopping over five frequencies were used to obtain the values for the slopes in the present embodiment, and ultimately the value for C, since it gives intermediate values in between the two extremes, ideal and no frequency hopping.

The procedure ends in step 299. Anyone skilled in the art realizes that steps 231 to 236 of FIG. 5 basically correspond to step 230 of FIG. 4.

A mobile station (MS), which incorrectly estimated the C/I, is of course not the only situation in which a high FER level can be obtained. A high FER value in the lowest, most robust codec mode is obtained when the radio conditions are poor, regardless of the values of the thresholds, and therefore FER values obtained when being in the lowest codec mode should be discarded, at least if they are high. Consequently, in one embodiment, one of the speech quality limits, the upper FER limit, may be set to infinity for the most robust codec mode.

Analogously, a low FER value in the highest, least robust codec mode is obtained when the radio conditions are excellent, regardless of the values of the thresholds, and therefore FER values obtained when being in the highest codec mode should be discarded, at least if they are low. Consequently, in one embodiment, one of the speech quality limits, the lower FER limit, may be set to infinity for the least robust codec mode.

When the link channel condition is so bad that a high FER level is obtained even though the MS is using the lowest codec mode further considerations have to be made. In this case there should of course be no change of the thresholds. To distinguish between the different cases of high FER levels, we would have liked to have the proportion of the different codec modes used during the last EMR. A high FER level and a high proportion of the lowest codec mode would then indicate a bad channel and not an MS with a incorrect C/I estimation. Unfortunately, this information is typically not available in the present embodiment. In the present embodiment we have instead to use what is available in the EMR, namely the latest codec mode used by the MS.

Figure 6:
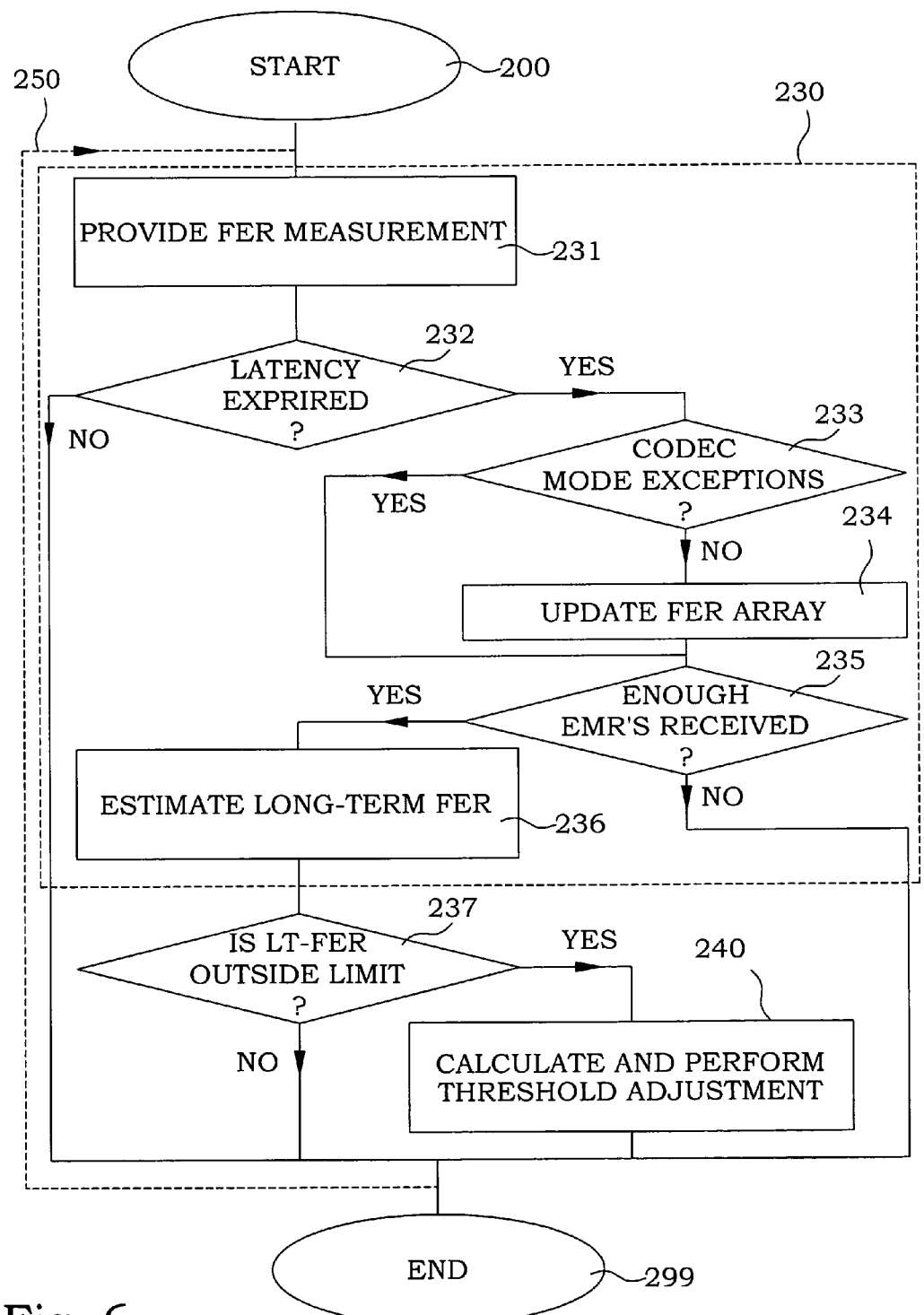
FIG. 6 is a flow diagram of main steps of yet another embodiment of a method according to the present invention.

As illustrated in FIG. 6, a particular embodiment comprises a step 233, which determines if a reported FER value should be used for updating the FER array or not. If, for instance, the latest codec mode used by the MS is the lowest codec mode in the current ACS, the reported FER value may be discarded. Such FER value will then not influence the long-term average. For not prohibiting low FER values obtained during the lowest codec mode to influence the $FER_{lt}$, it is preferred if the discarding step also is dependent on the actual FER value so that e.g. a FER value below the FER target value are allowed to be included in the $FER_{lt}$ calculation.

An analogue routine is present for discarding FER values obtained in the highest codec mode, in particular when such FER values are low.

Notice that the present embodiment does not halt the entire algorithm when the communication takes place via the lowest (or highest) codec mode, but continues with the threshold adjustment calculation. It is only the updating of the FER array that is not performed if the lowest (or highest) codec mode is used. The reason for this is a bit obscure and perhaps a bit far fetched, but there is a slight possibility that the Mobile Station (MS) has been in a codec mode other than the lowest, and that the estimated $FER_{lt}$ is higher than the upper FER limit, but that you are prevented from adjusting the thresholds for other reasons. Assume then that the radio quality drops so that a codec mode switching to the lowest codec mode occurs, and that at the same time as the adjustment restriction is lifted. We now have the situation where we know that the codec mode switching thresholds should be adjusted, but if we did not allow the example algorithm to continue when we are in the lowest mode no adjustment would be made. The example algorithm would remain in this state until the radio channel improves and we switch to a higher codec mode. The example adaptive threshold algorithm is now allowed to adjust the threshold and does so, and the new mode switching threshold would probably cause an immediate down regulation to the lowest codec mode, creating two codec mode switchings (an upgrading followed by a downgrading) that are almost consecutive. If we on the contrary allow the example adaptive threshold algorithm to adjust the thresholds even if we are in the lowest codec mode, we thereby avoid this unnecessary up and down codec mode switching.

A simulation according to the embodiment illustrated in FIG. 6 has been performed using an AMR link simulator. The incorrect estimation of C/I was simulated by adding a C/I offset in the link adaptation routine, just before the actual codec mode selection, causing the link adaptation to believe that the channel had a higher C/I than it really had and consequently sometimes wrongly selecting a higher codec mode. Four different variants were simulated, "normal" with a correct C/I estimation, "+2 dB" with the C/I constantly overestimated with 2 dB, "+5 dB" with the C/I constantly overestimated with 5 dB, and "+8 dB" with the C/I constantly overestimated with 8 dB. The simulations were based on a version of the embodiment where the calculation of the threshold adjustment for AT2 and FR was replaced by simply setting the threshold adjustment to 2.5 dB.

The channel was TU3 and a frequency hopping scenario was simulated, hopping over 5 frequencies (5FH). The length of the simulations was 22000 speech frames, i.e. 440 seconds. The C/I profile was a continuously varying profile in which the C/I varied between ~21 dB and ~3 dB.

Figure 7:
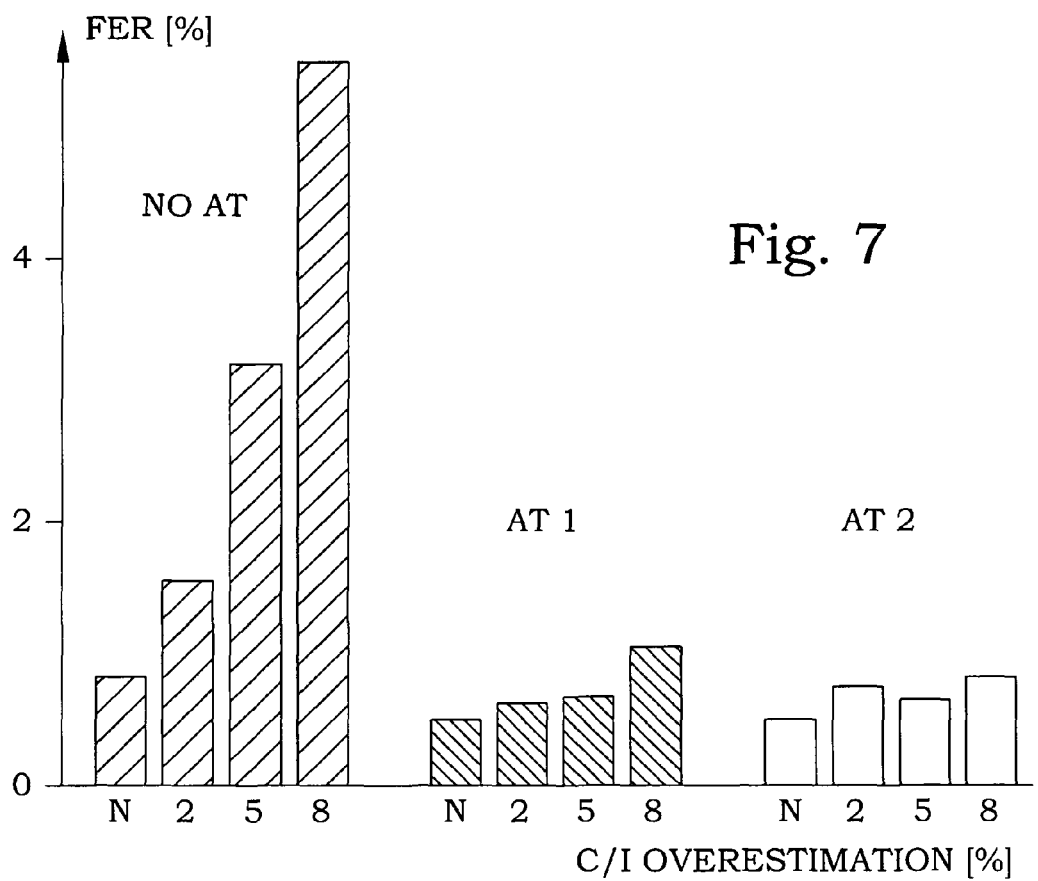
FIG. 7 is a diagram illustrating simulation results according to embodiments of the present invention.

The average FER from the simulations are plotted in FIG. 7. The FER values given here are only calculated for frames in which the lowest codec mode has not been used. Notice that the FER values are averages calculated over all the whole simulation run, and this means that it contains frame erasures that occurred before the adaptive threshold algorithm had settled.

From FIG. 7 it can be seen that both variants of the example adaptive threshold algorithm works quite well, and both are able to reduce the FER rather substantially. In most cases, the "AT2" variant outperforms "AT1".

Figure 8A:
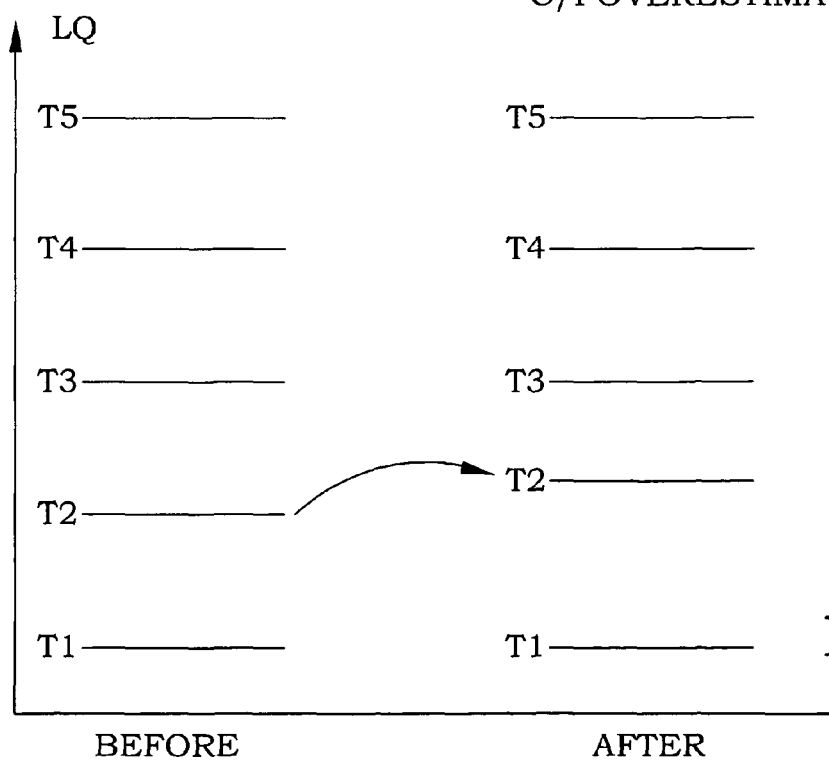
FIG. 8A is a diagram illustrating a principle for threshold adaptation used in an embodiment of the present invention.
Figure 8B:
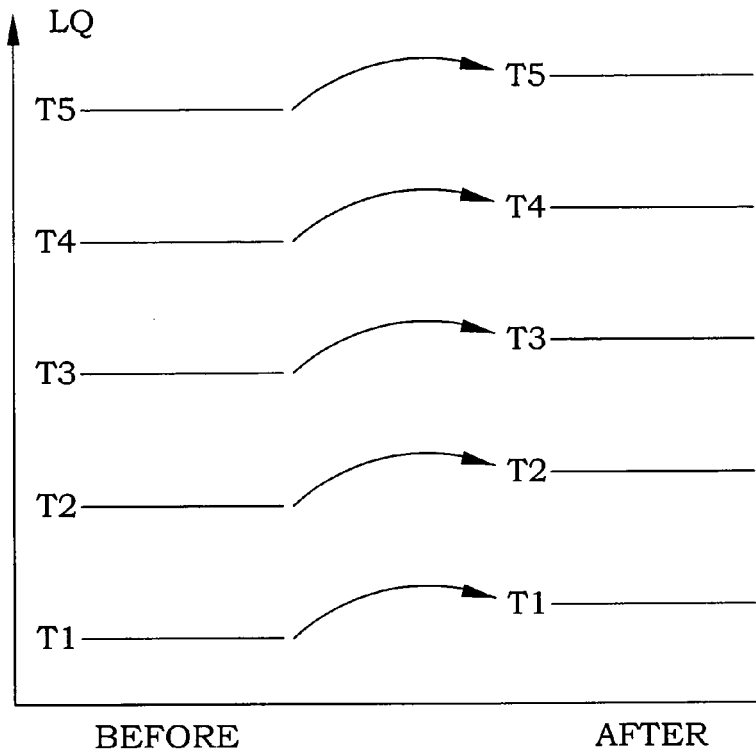
FIG. 8B is a diagram illustrating a principle for threshold adaptation used in another embodiment of the present invention.
Figure 8C:
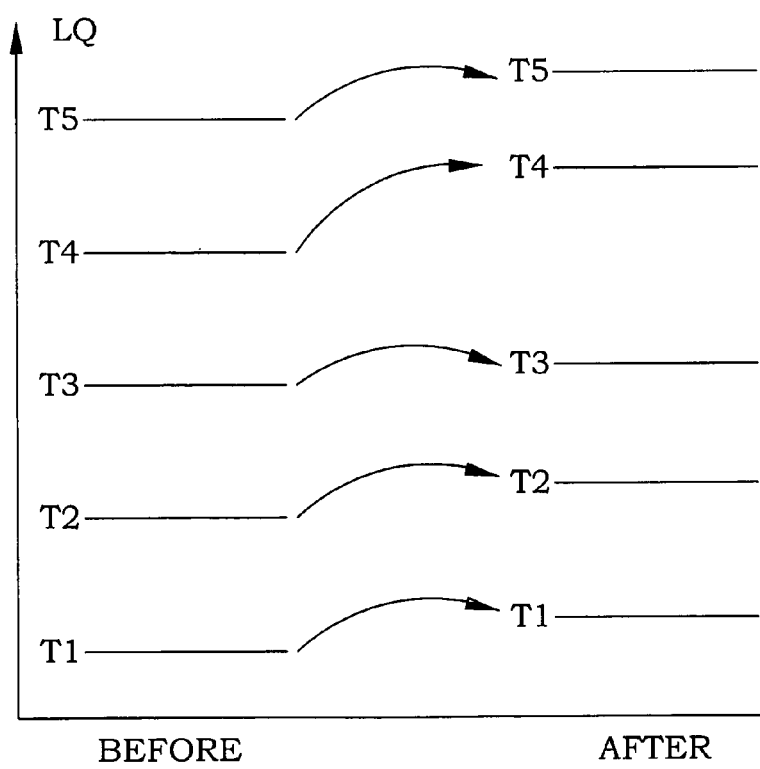
FIG. 8C is a diagram illustrating a principle for threshold adaptation used in yet another embodiment of the present invention.
Figure 8D:
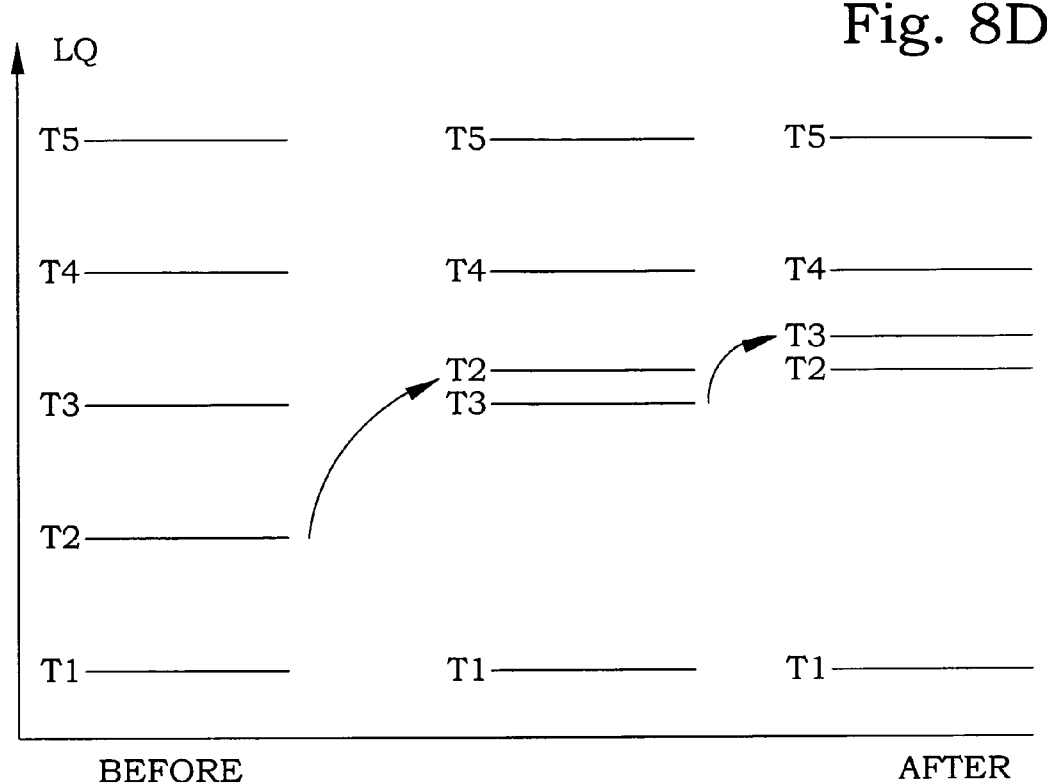
FIG. 8D is a diagram illustrating a principle for threshold adaptation used in a further embodiment of the present invention.

As mentioned further above, there are some different approaches to how the thresholds should be updated. FIG. 8A illustrates an extreme approach when only the particular threshold around which the link quality currently is present is adjusted. FIG. 8B illustrates the other extreme approach, where all thresholds are adapted by the same amount, regardless of which was subject for the evaluation. FIG. 8C illustrates another embodiment, where all thresholds are adjusted, but where the adaptation amount differs from one threshold to the other according to any predetermined relations. FIG. 8D illustrates a variation of FIG. 8A, where only one threshold is adjusted initially. However, in this embodiment, the adapting procedure comprises an evaluation step, where it is concluded if the adapted threshold passes another threshold. If that is the case, the threshold that is passed is also adapted, for keeping the thresholds in the same order as they originally were.

Another aspect of the adaptation is whether the adaptation is made individually, for a certain group of users or terminals, or generally. In one aspect, the thresholds are intended to be equal to each mobile station or user that is connected to the cell in which the present invention is applied. Such an approach will easily compensate for systematic errors in setting the original threshold values. Also errors made by the base station controlling the cell can be compensated in this manner. However, errors made by individual mobile stations can not be compensated generally. Instead, such an approach will become somewhat unstable, if terminals having considerably differing C/I measurements strive in different directions.

If systematic mobile station errors are believed to depend on the actual manufacturer or the model number of the mobile station, the threshold adaptations could be made valid for all mobile stations belonging to a certain group of mobile stations. Knowledge of the manufacturer or model number then has to be available for the node performing the adaptation.

Figure 8E:
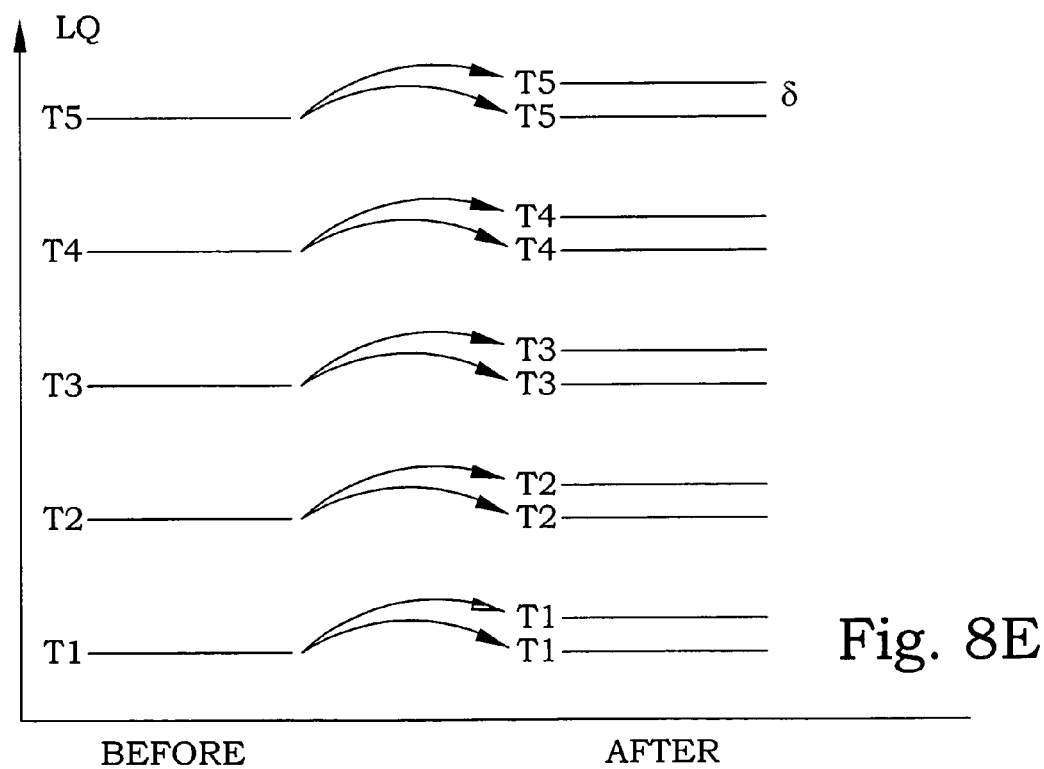
FIG. 8E is a diagram illustrating a principle for threshold adaptation used in yet a further embodiment of the present invention.

Individual mobile stations may also have slightly differing systematic errors, which only can be compensated by allowing each individual user to have its own set of thresholds. FIG. 8E illustrates such an approach. An initial threshold is adapted for a first mobile station by an amount β, while the threshold is kept unchanged for a second mobile station.

Furthermore, the initial or original set of threshold that is used for a user upon call establishment may be selected in different ways. One way is to select an original set of threshold that is equal to the set last used by the user. This may be practically possible if the mobile station saves information about the used thresholds. However, since the number of potential users is huge, this approach is not very probable if only the base station system has access to the actual threshold levels. A preferred way would in such cases instead be to base the original set of thresholds on a last used set of thresholds for the same type of receiver, e.g. the same manufacturer or the same model number.

This initiation procedure could be enhanced by registering statistics of threshold adjustments and receiver properties. An original set of thresholds upon call establishment can then be made dependent on statistical behavior of receivers having similar receiver properties.

As mentioned further above, the present invention can be applied on uplink as well as downlink communication. The present invention can also be applied at the mobile station side as well as at the base station system side. FIGS. 9A-D illustrates these alternatives.

Figure 9A:
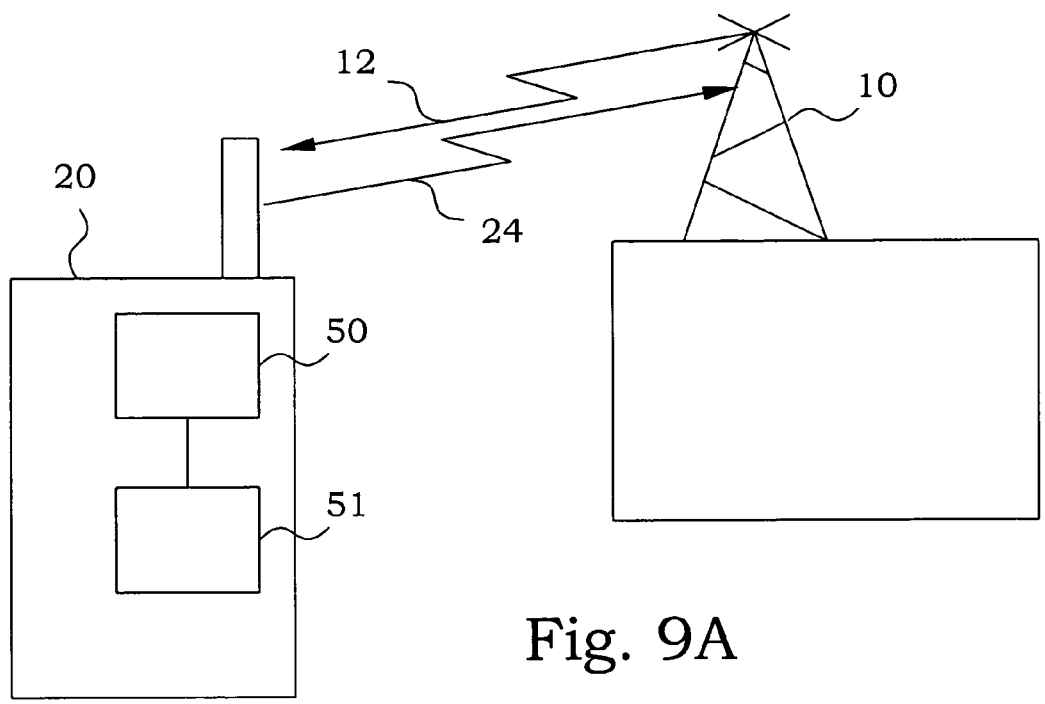
FIG. 9A is a schematic block scheme of main parts of an embodiment of a codec system for downlink transmission according to the present invention.

In FIG. 9A, downlink 12 communication is considered. The mobile station 20 comprises measurement means 50 for measuring the speech quality in the received downlink 12 speech. The mobile station 20 further comprises a codec selection threshold adaptation unit 51, which performs the evaluation procedures according to the present invention and provides proposals for threshold adaptations. A request 24 for carrying through such adaptations is transmitted to a communication network node, in this case the base station 10, which decides if the adaptations should be performed. Alternatively, if the system allows for that, the mobile station 20 may perform the threshold adaptations.

Figure 9B:
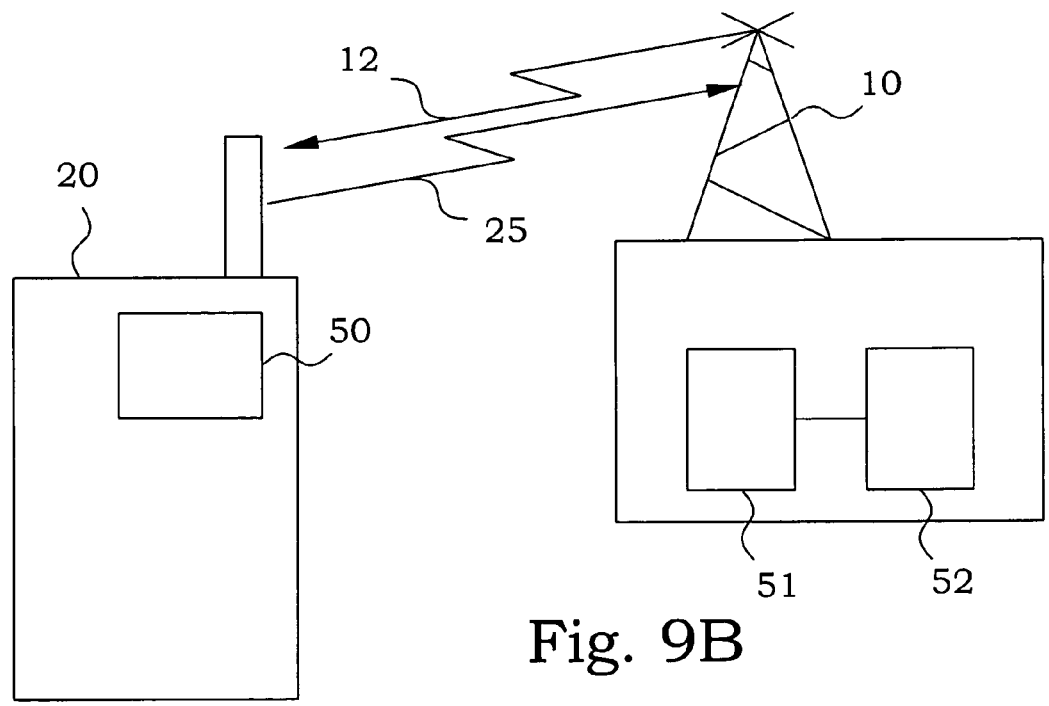
FIG. 9B is a schematic block scheme of main parts of another embodiment of a codec system for downlink transmission according to the present invention.

In FIG. 9B, downlink 12 communication is again considered. The mobile station 20 also here comprises measurement means 50 for measuring the speech quality in the received downlink 12 speech. The mobile station 20 reports 25 the outcome of the measurements uplink to a communication network node, in this particular case the base station 10. The base station 10 comprises in this embodiment the codec selection threshold adaptation unit 51, which performs the evaluation procedures according to the present invention and the base station 10 performs the adaptation. The thresholds and/or adaptation history of the thresholds are preferably stored in a storage 52.

Figure 9C:
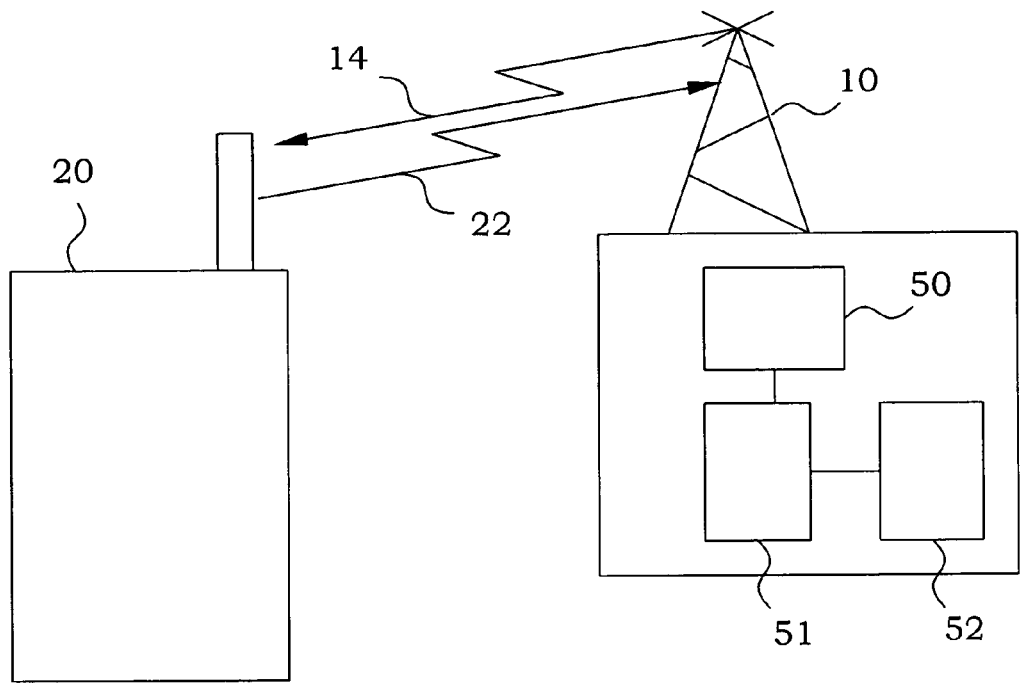
FIG. 9C is a schematic block scheme of main parts of an embodiment of a codec system for uplink transmission according to the present invention.

In FIG. 9C, uplink 22 communication is instead considered. A communication network node, in this case the base station 10, here comprises the measurement means 50 for measuring the speech quality in the received uplink 12 speech. The base station 10 comprises in this embodiment also the codec selection threshold adaptation unit 51, which performs the evaluation procedures according to the present invention. The base station 10 performs the adaptation and sends a command 14 to the mobile station about what codec mode to use.

Figure 9D:
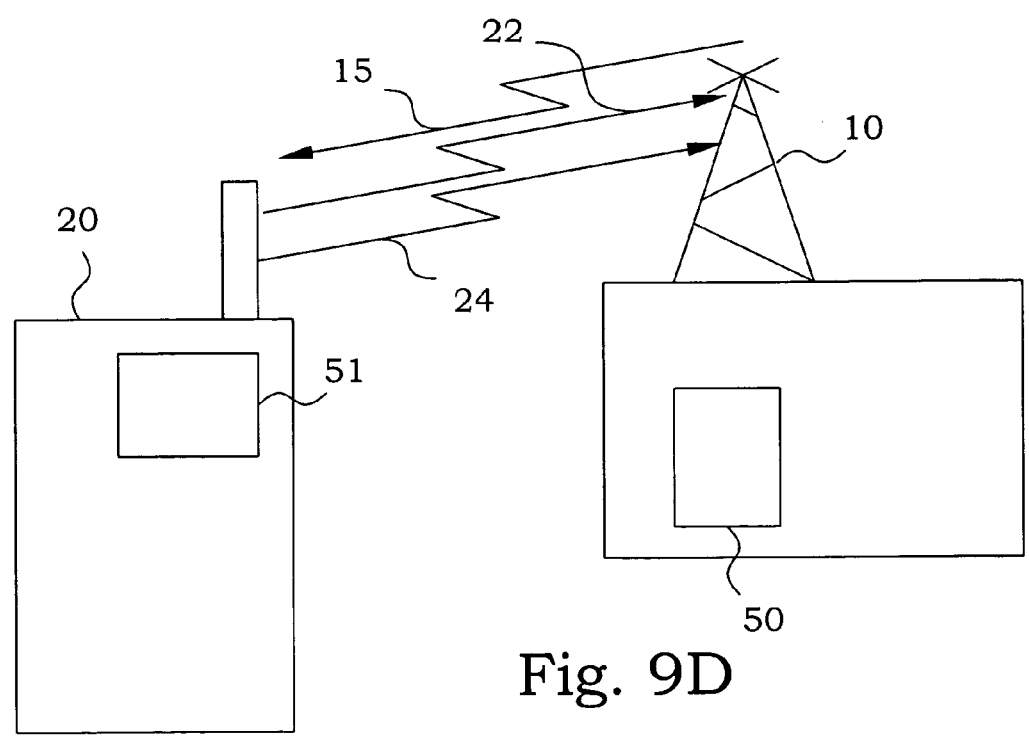

In FIG. 9D, uplink 22 communication is considered. This embodiment is probably the least useful. A communication network node, in this case the base station 10 comprises the measurement means 50 for measuring the speech quality in the received uplink 12 speech. The base station 10 sends a report 15 of the outcome of the measurements to the mobile station 20. The mobile station 20 comprises in this embodiment the codec selection threshold adaptation unit 51, which performs the evaluation procedures according to the present invention and provides proposals for threshold adaptations. A request 24 for carrying through such adaptations is transmitted to the base station 10, which decides if the adaptations should be performed. Alternatively, if the system allows for that, the mobile station 20 may perform the threshold adaptations.

In the different embodiments above, reports, commands and requests are transmitted between the base station and the mobile station. As described above, EMR is a good candidate for transmitting measurement results. However, the speech quality measure as well as commands and/or requests can be transferred between the receiver and transmitter by using any communication channel, e.g. EMR, inband signaling, control channel signaling etc.

The present invention is intended to operate with AMR and AMR-like speech and audio codecs, e g AMR-WB and AMR-WB+, regardless of the particular radio access method, but may also operate with other codec selecting techniques that are based on link quality thresholds.

In the embodiments described above, the means for performing the methods of the invention are described as being comprised in the mobile terminal and/or the base station. However, the communication network means can also be comprised in other communication network nodes than the base station, e.g. in a base station controller or any other node being connected to the base station. For instance, in the embodiment of FIG. 9C, the measurement means 50 could e.g. be provided for in the base station, while the codec selection threshold adaptation unit 51 and/or storage 52 may be provided for in a base station controller instead.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] 3GPP TS 26.071, AMR speech codec; General description.
[2] 3GPP TS 26.171, Wideband AMR speech codec; General description.
[3] 3GPP TS 45.009: Link Adaptation
[4] S. Wanstedt, J. Petterson, X. Tan, and G. Heikkila, Development of an objective speech quality measurement model for the AMR codec, MESAQIN 2002.
[5] ITU-T P.862, Perceptual evaluation of speech quality (PESQ).
[6] 3GPP TS 45.008, Radio subsystem link control.

The invention claimed is:
1. A method for adapting thresholds for speech codec selection in a codec, comprising:
providing, by a codec selector in said codec an estimate of presently received signal quality of speech; and
dynamically adapting, by the codec selector in said codec, in response to said estimate of said presently received signal quality of said speech, a set of thresholds for link quality used for selecting a codec mode to be used in said codec among a set of available codec modes.

2. The method according to claim 1, wherein said dynamic adaptation of said set of thresholds is valid for all transmissions from a node performing said dynamically adapting step.

3. The method according to claim 1, wherein said dynamic adaptation of said set of thresholds is valid for all transmissions to receivers belonging to a group of receivers having common properties.

4. The method according to claim 1, wherein said dynamic adaptation of said set of thresholds is valid only for transmissions to a receiver actually performing said estimate of said presently received signal quality.

5. The method according to claim 1, wherein said signal quality of said speech is at least one of:
FER;
BER;
SQI;
RxQual; and
PESQ.

6. The method according to claim 1, wherein said estimate of said presently received signal quality is long-time averaged.

7. The method according to claim 6, wherein said estimate of said presently received signal quality is averaged over a pre-determined number of measurements.

8. The method according to claim 7, wherein said pre-determined number is dependent on at least one of:
present codec mode;
properties of receiver equipment;
time of the day; and
day of the week.

9. The method according to claim 1, wherein said step of providing an estimate of said presently received signal quality comprises:
measuring said presently received signal quality in a mobile terminal on downlink signals.

10. The method according to claim 9, wherein said step of providing an estimate of said presently received signal quality further comprises:
transferring information representing said measured presently received signal quality of said speech to a communication network node;
whereby said step of dynamically adapting is performed in a communication network node.

11. The method according to claim 10, wherein said steps of transferring information comprises transmitting on a communication channel between said mobile terminal and said communication network node selected from at least one of:
EMR;
inband signaling; and
control channel signaling.

12. The method according to claim 9, wherein said step of dynamically adapting is performed in said mobile terminal.

13. The method according to claim 11, further comprising:
reporting said adapted set of thresholds to said communication network node.

14. The method according to claim 9, wherein said step of dynamically adapting said set of thresholds comprises:
computing proposed threshold adaptation values in said mobile terminal;
transferring information representing said proposed threshold adaptation values from said terminal to a communication network node;
evaluating said proposed threshold adaptation values in said communication network node; and
adapting, in said communication network node said set of thresholds according to said proposed threshold adaptation values if said proposed threshold adaptation values are found to be appropriate.

15. The method according to claim 14, further comprising:
transferring information representing said measured said presently received signal quality of said speech to a mobile terminal;
whereby said step of dynamically adapting is performed in said mobile terminal.

16. The method according to claim 1, wherein said step of providing an estimate of said presently received signal quality of said speech comprises:
measuring said presently received signal quality of said speech in a communication network node on uplink signals.

17. The method according to claim 16, wherein said step of dynamically adapting is performed in said communication network.

18. The method according to claim 17, wherein said step of dynamically adapting is performed in a node of said communication network different from said communications network node performing said measurement.

19. The method according to claim 17, further comprising:
reporting said adapted set of thresholds to a mobile terminal providing said uplink signal.

20. The method according to claim 1, wherein said step of providing an estimate of said presently received signal quality is delayed for a predetermined latency time after a threshold adaptation has been performed.

21. The method according to claim 1, wherein said step of dynamically adapting said set of thresholds comprises adjustment of all thresholds in said set of thresholds by a same amount.

22. The method according to claim 21, wherein said same amount is calculated as:

$$\Delta\Theta = f(SQ_e, SQ_t)$$

where $\Delta\Theta$ is said same amount, $f(\ )$ is a predetermined function having two variables, $SQ_e$ is the estimated said presently received signal quality of said speech and $SQ_t$ is a target received signal quality of said speech.

23. The method according to claim 22, wherein said signal quality of said speech is FER and said same amount is calculated as:

$$\Delta\Theta = C_{10}^{10} \log \frac{FER_e}{FER_t},$$

where $C_{10}$ is a constant determining algorithm aggressively, $FER_e$ is the estimated presently received FER and $FER_t$ is a target received FER.

24. The method according to claim 1, wherein said step of dynamically adapting said set of thresholds comprises adjustment of said thresholds of said set of thresholds by amounts determined by a relation being dependent on the threshold in question.

25. The method according to claim 1, wherein said step of dynamically adapting said set of thresholds comprises adjustment of only one threshold of said set of thresholds by an amount ensuring that said one threshold does not pass any other threshold of said set of thresholds.

26. The method according to claim 1, wherein said step of providing an estimate of said presently received signal quality is restricted when at least one of a lowest and a highest codec mode is used.

27. The method according to claim 1, further comprising providing an original set of thresholds upon call establishment being equal to a last used set of thresholds for the same receiver.

28. The method according to claim 1, further comprising:
registering statistics of threshold adjustments and receiver properties; and
providing an original set of thresholds upon call establishment being dependent on statistical behavior of receivers having similar receiver properties.

29. A speech codec selection method, comprising:
providing, in a codec, a measurement of link quality;
selecting, by said codec, a codec mode to be used among a set of available codec modes by comparing said measured link quality to a set of thresholds; and
adapting thresholds, by a codec selector in said codec, according to the substeps of:
  providing an estimate of a presently received signal quality; and
  dynamically adapting, in response to said estimate of said presently received signal quality, said set of thresholds.

30. The codec selection method according to claim 29, wherein said providing and selecting steps are parts of an AMR procedure.

31. An arrangement for adapting thresholds used for speech codec selection, comprising:
measurement means for providing an estimate of a presently received signal quality of speech; and
an adaptation unit for dynamically adapting, in response to said estimate of said presently received signal quality of said speech, a set of thresholds for link quality used for selecting a codec mode to be used among a set of available codec modes.

32. The arrangement according to claim 31, wherein said means for providing an estimate of said presently received signal quality of said speech in turn comprises a receiver arranged for receiving information representing said measured said presently received signal quality of said speech.

33. A speech selection unit, comprising:
means for providing link quality measurements;
means for selecting a codec mode to be used among a set of available codec modes by comparing said measured link quality to a set of thresholds; and
arrangement for adapting thresholds in turn comprising:
  means for providing an estimate of a presently received signal quality of speech; and
  means for dynamically adapting, in response to said estimate of said presently received signal quality of said speech, said set of thresholds.

34. A radio communications network node, comprising:
an arrangement for adapting thresholds in turn comprising:
  means for providing an estimate of a presently received signal quality of speech; and
  means for dynamically adapting, in response to said estimate of said presently received signal quality of said speech, a set of thresholds for link quality used for selecting a codec mode to be used among a set of available codec modes.

35. The radio communications network node according to claim 34, wherein said radio communications network node is a radio base station.

36. A mobile terminal, comprising an arrangement for adapting thresholds, said arrangement comprising:
means for providing an estimate of said presently received signal quality of speech; and
means for dynamically adapting, in response to said estimate of said presently received signal quality of said speech, a set of thresholds for link quality used for selecting a codec mode to be used among a set of available codec modes.

37. A radio communications network, comprising:
an arrangement for adapting thresholds, said arrangement comprising:
  means for providing an estimate of a presently received signal quality; and
  means for dynamically adapting, in response to said estimate of said presently received signal quality of speech, a set of thresholds for link quality used for selecting a codec mode to be used among a set of available codec modes,
whereby said means for providing an estimate of said presently received signal quality of said speech and said means for dynamically adapting are comprised in different nodes of said radio communications network.

* * * * *